United States Patent
Cupka et al.

(10) Patent No.: US 8,356,054 B2
(45) Date of Patent: Jan. 15, 2013

(54) MANAGEMENT OF RESOURCES IN A HOST SYSTEM

(75) Inventors: Patrick J. Cupka, Poughkeepsie, NY (US); Steven G. Dittmar, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/615,551

(22) Filed: Nov. 10, 2009

(65) Prior Publication Data

US 2011/0113065 A1     May 12, 2011

(51) Int. Cl.
*G06F 17/30*     (2006.01)
(52) U.S. Cl. ......... 707/781; 707/783; 715/741; 715/743
(58) Field of Classification Search .......... 707/781–785; 709/214, 217–218
See application file for complete search history.

(56) References Cited

U.S. PATENT DOCUMENTS

| | | | |
|---|---|---|---|
| 6,504,915 B1 * | 1/2003 | Kruesi et al. ............... | 379/88.18 |
| 6,965,893 B1 * | 11/2005 | Chan et al. ............... | 1/1 |
| 7,073,176 B1 * | 7/2006 | Simmons et al. ............ | 718/104 |
| 7,150,019 B1 * | 12/2006 | Simmons et al. ............ | 718/104 |
| 7,302,701 B2 * | 11/2007 | Henry ............................ | 726/11 |
| 7,624,437 B1 * | 11/2009 | Fagundo et al. ............... | 726/15 |
| 7,672,981 B1 * | 3/2010 | Faibish et al. .......... | 707/999.204 |
| 7,792,916 B2 * | 9/2010 | Dowedeit ..................... | 709/214 |
| 7,908,339 B2 * | 3/2011 | Keith, Jr. .................... | 709/217 |
| 8,117,639 B2 * | 2/2012 | MacKinnon et al. ............ | 726/1 |
| 2001/0011341 A1 * | 8/2001 | Hayes, Jr. et al. ............... | 712/11 |
| 2002/0161955 A1 * | 10/2002 | Beukema et al. ............ | 710/200 |
| 2003/0131235 A1 * | 7/2003 | Wheeler et al. ............... | 713/168 |
| 2003/0172069 A1 * | 9/2003 | Uchiyama et al. ................. | 707/9 |
| 2004/0128508 A1 * | 7/2004 | Wheeler et al. ............... | 713/170 |
| 2005/0015353 A1 * | 1/2005 | Kumar et al. ..................... | 707/1 |
| 2005/0015425 A1 * | 1/2005 | Kumar et al. ................. | 709/200 |
| 2006/0206901 A1 * | 9/2006 | Chan ............................. | 718/107 |
| 2006/0230411 A1 * | 10/2006 | Richter et al. ................ | 719/328 |
| 2006/0242644 A1 * | 10/2006 | Blue ............................ | 718/100 |
| 2007/0192524 A1 * | 8/2007 | Chan et al. .................... | 710/200 |
| 2007/0198656 A1 * | 8/2007 | Mazzaferri et al. ........... | 709/218 |
| 2007/0266196 A1 * | 11/2007 | Torii ............................. | 710/309 |
| 2007/0271450 A1 * | 11/2007 | Doshi et al. ................... | 712/245 |

(Continued)

OTHER PUBLICATIONS

Microsoft.com library [retrieved Nov. 5, 2009] from the Internet http://msdn.microsoft.com/en-us/library/bb530198(printer).aspx, "Registry Visualization in Windows Vista", Jun. 2007, pp. 1-5, Microsoft Corporation.

(Continued)

*Primary Examiner* — Hanh Thai
(74) *Attorney, Agent, or Firm* — Cantor Colburn LLP; Steven Chiu

(57) ABSTRACT

A computer implemented method for managing access to system resources includes receiving a request from a user for write-access to a resource in a host system, the host system including write-access permissions to the resource for one or more selected users. The method also includes accessing the resource in the host system, presenting the resource to the user to allow the user to make changes to the resource, determining whether the user has write-access permission to the resource, and determining whether the resource is a temporarily writable resource. The method further includes, responsive to the resource being temporarily writable and the user not having write-access permission, discarding changes to the resource made by the user and returning the resource without the changes to the host system.

13 Claims, 3 Drawing Sheets

U.S. PATENT DOCUMENTS

| | | | |
|---|---|---|---|
| 2008/0120727 A1* | 5/2008 | Lee et al. | 726/30 |
| 2008/0134322 A1* | 6/2008 | Chauvel et al. | 726/21 |
| 2008/0242264 A1* | 10/2008 | Malik et al. | 455/411 |
| 2008/0243846 A1* | 10/2008 | Rasmussen | 707/8 |
| 2008/0294698 A1* | 11/2008 | Fujimoto et al. | 707/200 |
| 2010/0097463 A1* | 4/2010 | Tsuzuki et al. | 348/143 |
| 2010/0235831 A1* | 9/2010 | Dittmer | 718/1 |

OTHER PUBLICATIONS

Wikipedia, [online]; [retrieved on Nov. 5, 2009] from the Internet http://en.wikipedia.org/wiki/Virtual_file_system "Virtual file system", last modified on Oct. 23, 2009, pp. 1-4, Wikipedia.

* cited by examiner

MANAGEMENT OF RESOURCES IN A HOST SYSTEM

BACKGROUND

This invention relates generally to processing within a computing environment and more particularly to facilitating access to computer system resources.

In computing file systems, multiple applications may simultaneously require write-access to a resource while the user understands that alterations to the resource by the applications are discardable. With present day technology, only a single application can hold write-access to a resource at any time. This serializes access to the resource for any applications requiring write-access, and also prevents a user from allowing simultaneous write-access to the resource, even if they do not want to keep updates to the resource.

Current technologies employ various techniques to address this problem. Such techniques include making a resource read-only to prevent applications from altering the resource, changing an application's requirements such as file access requirements, and duplicating the resource.

BRIEF SUMMARY

An exemplary embodiment includes a computer implemented method for managing access to system resources. The method includes receiving a request from a user for write-access to a resource in a host system, the host system including write-access permissions to the resource for one or more selected users. The method also includes accessing the resource in the host system, presenting the resource to the user to allow the user to make changes to the resource, determining whether the user has write-access permission to the resource, and determining whether the resource is a temporarily writable resource. The method further includes, responsive to the resource being temporarily writable and the user not having write-access permission, discarding changes to the resource made by the user and returning the resource without the changes to the host system.

Another exemplary embodiment includes a computer program product for managing access to system resources. The computer program product includes a tangible storage medium readable by a processing circuit and storing instructions for execution by the processing circuit for performing a method. The method includes receiving a request from a user for write-access to a resource in a host system, the host system including write-access permissions to the resource for one or more selected users. The method also includes accessing the resource in the host system, presenting the resource to the user to allow the user to make changes to the resource, determining whether the user has write-access permission to the resource, and determining whether the resource is a temporarily writable resource. The method further includes, responsive to the resource being temporarily writable and the user not having write-access permission, discarding changes to the resource by the user and returning the resource without the changes to the host system.

A further exemplary embodiment includes a system for managing access to resources in a host system that includes a computer memory and a processor in communication with the computer memory. The processor includes an instruction fetching unit for fetching instructions from the computer memory and one or more execution elements for executing fetched instructions to perform a method. The method includes receiving a request from a user for write-access to a resource in a host system, the host system including write-access permissions to the resource for one or more selected users. The method also includes accessing the resource in the host system, presenting the resource to the user to allow the user to make changes to the resource, determining whether the user has write-access permission to the resource, and determining whether the resource is a temporarily writable resource. The method further includes, responsive to the resource being temporary writable and the user not having write-access permission, discarding changes to the resource by the user and returning the resource without the changes to the host system.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments of the present invention are directed to providing users access to resources in a system or network regardless of user permissions and without the need to duplicate resources. Exemplary embodiments allow multiple users to simultaneously access or open files for writing. Exemplary embodiments include a subsystem that interacts transparently with a user system to access files or other resources in a host system, and allow the user system to change the resource without necessarily committing the changes to the host system. For example, if write-access is not available to a user system for a selected resource, the subsystem acts to allow temporary changes to the resource and discards the changes when the user system releases the resource. This allows a user system application to be granted what it believes is write-access to a resource so that a user can access and temporarily modify the resource. The subsystem allows for that user system application to have write-access to the resource concurrently while other user system applications also have write-access to the resource.

Figure 1:
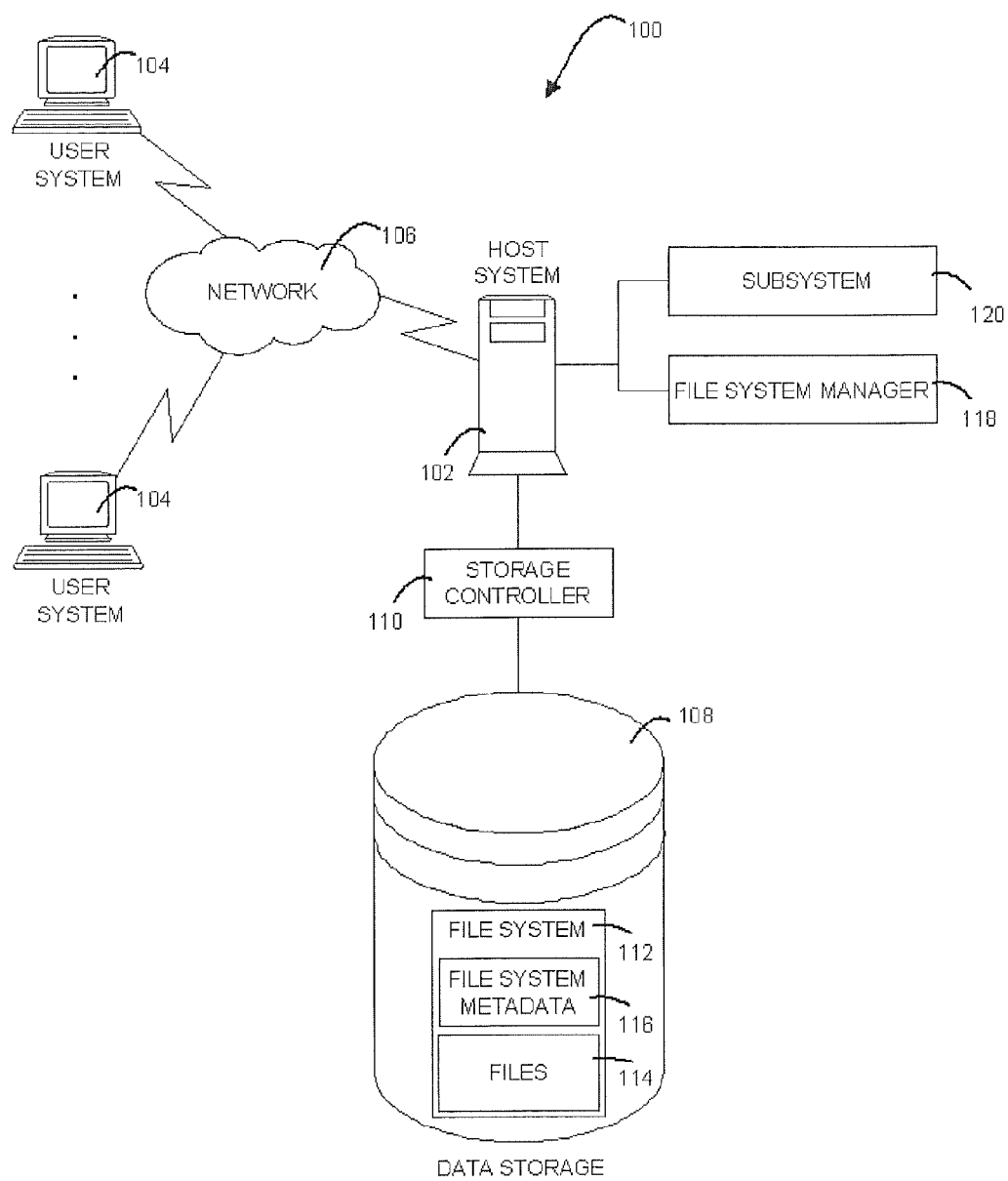
FIG. 1 depicts a block diagram of a computer system that may be implemented by an exemplary embodiment for managing access to resources in a host system.

Turning now to FIG. 1, an embodiment of a system 100 is illustrated for managing access to system resources for users and associated applications. As described herein, "resource" refers to any component of a computer system having limited availability. Examples of resources include virtual system resources such as files and file folders, network connections and memory areas. As used herein, "application" refers to any computer program or software accessible by a user. Examples of applications include word processing software and database applications.

The system 100 of FIG. 1 includes a host system 102 in communication with user systems 104 over a network 106. In exemplary embodiments, the host system 102 is a processing device (e.g., a mainframe computer, a desktop computer, a laptop computer, or the like) including at least one processing circuit (e.g., a CPU) capable of reading and executing instructions and handling interaction requests from the user systems 104 as a shared physical resource. The host system 102 may perform as a file server for storing and accessing files, or include any other suitable application, such as a network server, a database server or a web server. In exemplary embodiments, the host system 102 communicates with various user systems via the network 106.

The user systems 104 can be configured as personal computers or other processing systems that generally include a processing unit and memory. The memory may include a non-volatile system memory, random access memory (RAM) and/or temporary memory such as one or more caches. In exemplary embodiments, the user systems 104 include desktop computers, laptop computers, general-purpose computer devices and/or I/O devices, such as keyboard and display devices, which provide an interface for communicating with the host system 102. Users can initiate various tasks on the host system 102 via the user systems 104, such as accessing, modifying and storing files.

While only a single host system 102 is shown in FIG. 1, it will be understood that multiple host systems 102 can be implemented, each in communication with one another via direct coupling or via one or more networks. For example, multiple host systems 102 may be interconnected through a distributed network architecture.

The network 106 may be any suitable type of communications network. For example, the network 106 may be an intranet, extranet, an internetwork such as the Internet, or a combination thereof. The network 106 can include wireless, wired, and/or fiber optic links.

In exemplary embodiments, the host system 102 accesses and stores data in a data storage device 108 via a storage controller 110. The data storage device 108 refers to any type of computer readable storage medium and may comprise a secondary storage element such as a hard disk drive (HDD), tape, or a storage subsystem that is internal or external to the host system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. The storage controller 110 may be internal or external to the host system 102. For example, the storage controller 110 and the data storage device 108 can be packaged together in an HDD module. Alternatively, the storage controller 110 can be a card, assembly, or circuitry within the host system 102.

The storage device 108 includes a data repository such as a file system 112. In one embodiment, the storage device 108 is logically addressable as a consolidated data source across a distributed environment that includes networks 106. Information stored in the storage device 108 may be retrieved and manipulated via the host system 102 and/or the user systems 104. The data repository includes one or more databases containing files and/or other resources and corresponding data such as metadata, configuration parameters, values, methods, and properties, as well as other related information.

The host system 102 executes various applications, such as a file system manager 118 that controls read and write accesses to the file system 112 on the data storage device 108 via the storage controller 110. The host system 102 can also run other applications, and may serve as a file server, web server, application server, and/or a database server.

The file system 112 may be organized in a variety of configurations, such as a log-structured file system (LFS), depending upon an operating system implementation on the host system 102. The file system 112 can include numerous files 114 of varying sizes and types. The file system 112, in one embodiment, tracks and stores information about the files 114 as file system metadata 116. The file system metadata 116 may include information such as file name, physical location on the data storage device 108, size, time and date data, access frequency, and other such information associated with the files 114.

The host system 102 includes mechanisms such as the file system 112 and/or the file system manager 118 for administering permissions or access rights to various users. The permissions control the ability of users to modify the contents of files 114, metadata 116 and/or other resources. Examples of such permissions include read-access, in which a user is permitted to access and read a file 114, and write-access, in which a user is permitted to modify the file 114. Such modifications are allowed to persist and are saved in the file 114 in the storage device 108. Read-only is a permission status that can be assigned to a user to provide the user read-access to a resource, but not write-access. As described herein, a "user" refers to an operator identified in a user system 104 application.

In an exemplary embodiment, the system 100 is configured to allow multiple users to be granted a temporary write-access for a resource to allow users to work with and edit a resource as needed in a temporary memory area without persisting the edits in the file system 112 or duplicating the resource. Files that have this "temporary write-access" permission relative to a given user system 104 can be referred to as "temporarily writable" files or resources.

In one embodiment, a resource access subsystem 120 is included in the host system 102, network 106 and/or user systems 104 and is configured to manage access to the temporarily writable resources. In one embodiment, the subsystem 120 is configured to receive requests for access to resources in the host system 102, retrieve copies of resources for write-access and make copies of resources available to user systems 104. The subsystem 120 presents the resource to the user systems 104 and transparently "tricks" the applications in the user systems 104 into thinking that they each have write-access. The subsystem 120 may keep track of changes made to the resource by the user system 104 for the duration of time in which they hold the write lock to the resource. By granting multiple user systems 104 temporary write-access, users can work with the resource as needed in memory, but the subsystem 120 discards these changes whenever users close the resource or attempt to commit changes to the resource. The subsystem 120, acting as an administrator of the temporarily writable files, understands that changes to this resource are not wanted or needed and can thus simultaneously host the resource to multiple applications that require write-access.

In one embodiment, in the case where a temporarily writable resource includes an entire folder's worth of files or resources, the subsystem 120 does not need to make copies of each and every file therein in order for them to be hosted to user system 104 applications. Instead, only those files specifically requested by each user system 104 application are duplicated into memory. This can thus drastically reduce the user system 104 storage footprint while causing no greater memory footprint. The storage footprint is reduced, for example, relative to duplicating an entire folder's worth of files on a storage subsystem in order to have multiple users access their own instance of a file. Likewise, instead of transferring the entire contents of the folder to each user system 104, only the required files would be sent, thus drastically reducing the bandwidth footprint. In addition, the subsystem 120 causes no greater memory footprint because, even without the subsystem 120 in place, the file system/host system would still have to load into memory an instance of each file being "edited" by a user system application.

In one embodiment, the subsystem 120 is an independent program, which does not need to be associated with any specific user system, host system or file system. In one embodiment, the subsystem 120 is part of an abstraction layer of a system such as the user system 104 or the file system 112. For example, the subsystem 120 is a transparent layer, similar to a virtual file system (VFS) layer, in between the user system 104 and the file system 112. The subsystem 120 can incorporate multiple functionalities or a single functionality, such as is described by the method in FIG. 2. The subsystem 120 can be designated, by an administrator for example, as being applicable to a single resource or file, or to all or part of a resource system or file system. The subsystem 120 can be applied between a virtual file system and a real file system 112 that it is abstracting. In one embodiment, the subsystem 120 can be built directly into a virtual file system and work harmoniously to provide a temporarily writable function to a single file system 112 or to all file systems 112 masked by the virtual file system. This can be accomplished because the temporarily writable function is completely transparent, whether it is being used by a user or a virtual file system, as the function does not change how file handles are requested in any way.

Figure 2:
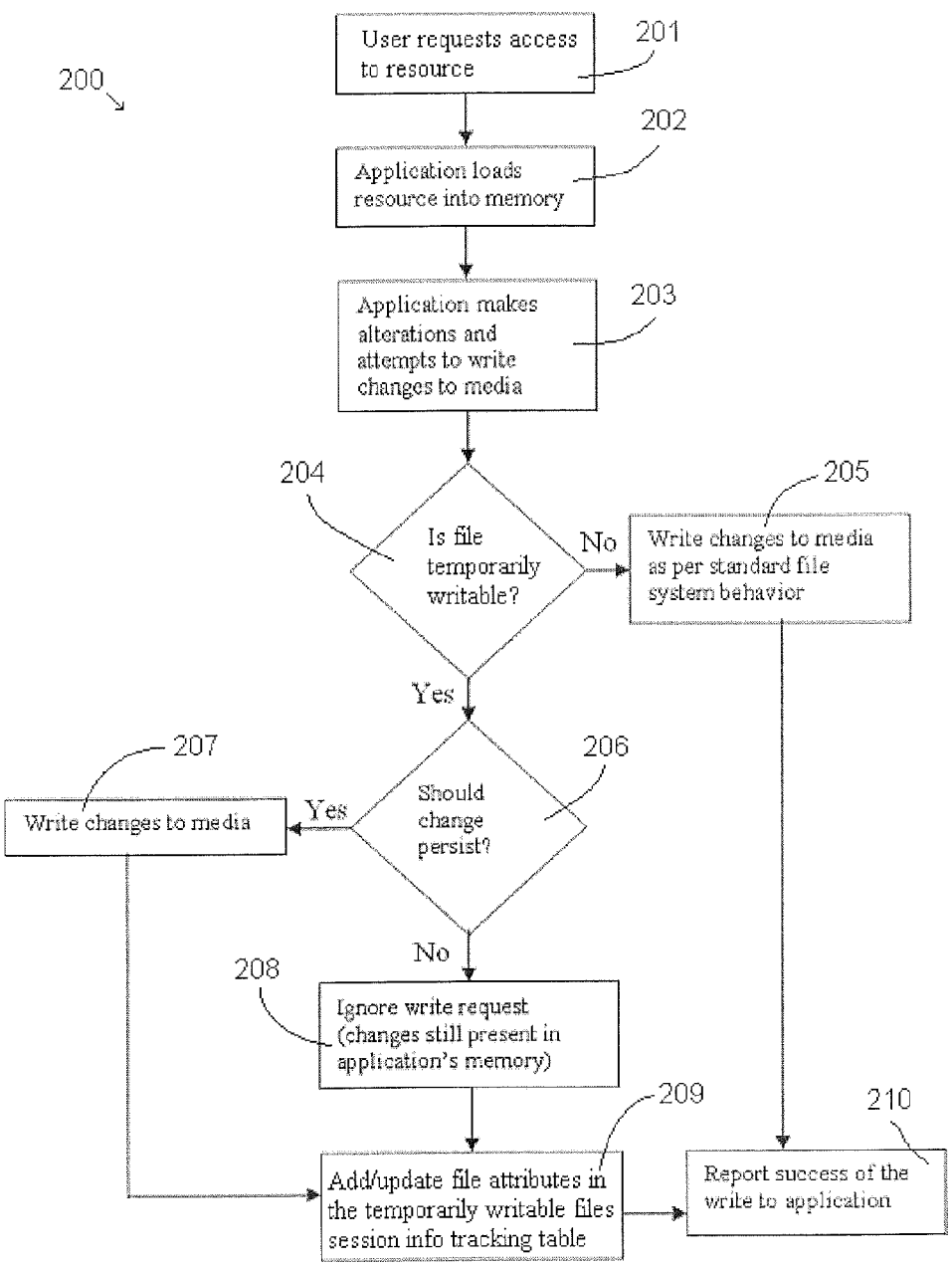
FIG. 2 depicts a process flow that may be implemented by an exemplary embodiment for managing access to resources in a host system.

Referring to FIG. 2, an exemplary method 200 of managing access to resources in a host system is illustrated. The method 200 may be used in conjunction with the system 100, but may also be used with any suitable network or processing configuration used to manage access to and use of resources. In an exemplary embodiment, the method 200 of FIG. 2 is implemented by the subsystem 120.

At block 201, an application in a user system 104 requests access to a resource. In one embodiment, the user system 104 specifically indicates in the request that the resource should be in a write mode, in which the user has write-access to the resource, or the host system 102 requires that the resource requested must be accessed in a write mode.

At block 202, the subsystem 120 accesses the resource in the file system 112. In one embodiment, the subsystem 120 requests the resource from the file system manager 118, which transfers a handle or other pointer associated with the requested resource to the subsystem 120. In one embodiment, the subsystem 120 inserts a hook in the user system 104 to access the resource in the file system 112.

In an exemplary embodiment, the subsystem 120 provides a copy of the resource to the user system 104. For example, the subsystem 120 loads a copy of the resource into a new space in memory for each write-access requested. The new spaces in memory for each request may be a space in a user system 104 memory, such as a cache or RAM, or may be a space in the host system 102. In one embodiment, all requesting user systems 104 receive a handle or other pointer or reference to their specific copy of the resource in memory.

At block 203, the user system 104 makes changes to the resource and attempts to write changes to the resource, for example, in response to a save command entered by a user, or due to an auto-save function.

At block 204, the subsystem 120 determines whether the resource is a temporarily writable resource. In one embodiment, with a hook into the file system 112 or other resource system on the host system 102, all requests for write-access to a resource are checked by the subsystem 120 against a table of defined temporarily writable resources. The subsystem 120 determines whether the resource is temporarily writable by checking whether the resource is listed in the table. In another embodiment, files, file folders or other resources are individually tagged to define whether or not the resources are temporarily writable. Various commands or interfaces can be used by administrators to dynamically add to and remove from the set of resources controlled by the temporarily writable resources subsystem.

At block 205, if the subsystem 120 determines that the resource is not temporarily writable, the resource and changes are handed off to the file system manager 118 for standard processing. The file system manager 118 applies normal rules to the changes, such as rules dictating whether to commit the changes, and contention/shared resource rules.

At block 206, if the resource is determined to be temporarily writable, the subsystem 120 determines whether the changes should persist. For example, the subsystem 120 checks whether the user has write permission to the resource. In one embodiment, the subsystem 120 determines whether the user has write permission from various tags in the user system 104 and the file system 112. Such tags include, for example, user identifications (IDs), administrator IDs and process IDs. This determination is performed independently of the determination of whether the resource is temporarily writable as discussed in stage 204.

At block 207, if the user does have write permission, the subsystem 120 permits changes to be written to the resource. In one embodiment, a commit command is executed prior to the return of the handle to the file system 112 and the close of the application that made the changes. The commit command could be executed, for example, via a command line by targeting the process ID of the application whose changes were desired to be kept, or similarly through a graphical user interface (GUI) that could provide a visual list of all currently open versions of the resource. Access to this type of command can be limited to administrators or a given user ID via user-based security mechanisms already in place in many operating systems. The subsystem 120, in one embodiment, defines a user or process ID as having true write access to the host system 102 such that saving alterations to the resource is completely transparent to the user.

At block 208, if the user does not have write permission and the resource was identified to be controlled as a temporarily writable resource, the subsystem 120 ignores the write request and returns the resource to the file system 112 without the changes. When a save command is received from the application or the resource is closed by the application, the subsystem 120 discards the changes made to the resource. Once the application is done with the resource and the handle is freed or the resource is otherwise released, the subsystem 120 frees the space in memory previously used for that application's copy of the resource. The subsystem 120, in one embodiment, does not persist user specific changes beyond the time that the file handle is held by the user.

At block 209, in one embodiment, the subsystem 120 can track or store the rejected resource changes in a temporary memory or other memory area for later access. For example, a tracking table such as a session info tracking table for temporarily writable files can be created to which file attributes can be added or updated. The subsystem 120 tracks all the changes to a resource, and saves the changes to the table. The table also correlates the changes to specific users, to allow users temporary access to their changes even though the changes are not committed to the resource. In one embodiment, the saved changes are retained in the table for as long as the user holds the file handle or until the file is otherwise released.

At block 210, the success of the write-request is reported to the user application. Regardless of whether the changes were persisted to the data storage 108, the application will think that the write was successful. Thus, the subsystem makes the method transparent by ignoring whether the changes were actually made to the resource.

Technical effects and benefits include allowing multiple users simultaneous temporary write access to a resource, regardless of each user's permission status, without the need for modifications of user applications or duplication of resources. The computer program products, methods and systems described herein are advantageous over prior art techniques and overcome the deficiencies of such techniques.

For example, some prior art techniques such as making a resource read-only may stop applications from altering the resource, however applications that require write-access will encounter run-time errors thereby limiting the efficacy of the technique. Other techniques include changing an application's requirements. In rare occasions, an application may have a configurable option to change the file access requirements. If no configurable option exists, a user would have to alter the application's source code not to require write-access. This is also rarely an option since source code, the required skills, and/or the required tools are often unavailable to users.

Another prior art technique includes duplicating the resource, which can be a simple but costly solution that could be executed as multiple copies of the resource on a host or as the ability to transfer a copy to each user's local system; both become problematic for large resources or large numbers of users. Multiple copies could require a lot of extra space and would limit the number of simultaneous users accessing the resource to the finite number of copies present on the host. On the other hand, transferring a copy to each user could require a considerable amount of bandwidth and time and may make it difficult to keep the copies in sync if the host copy is updated.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
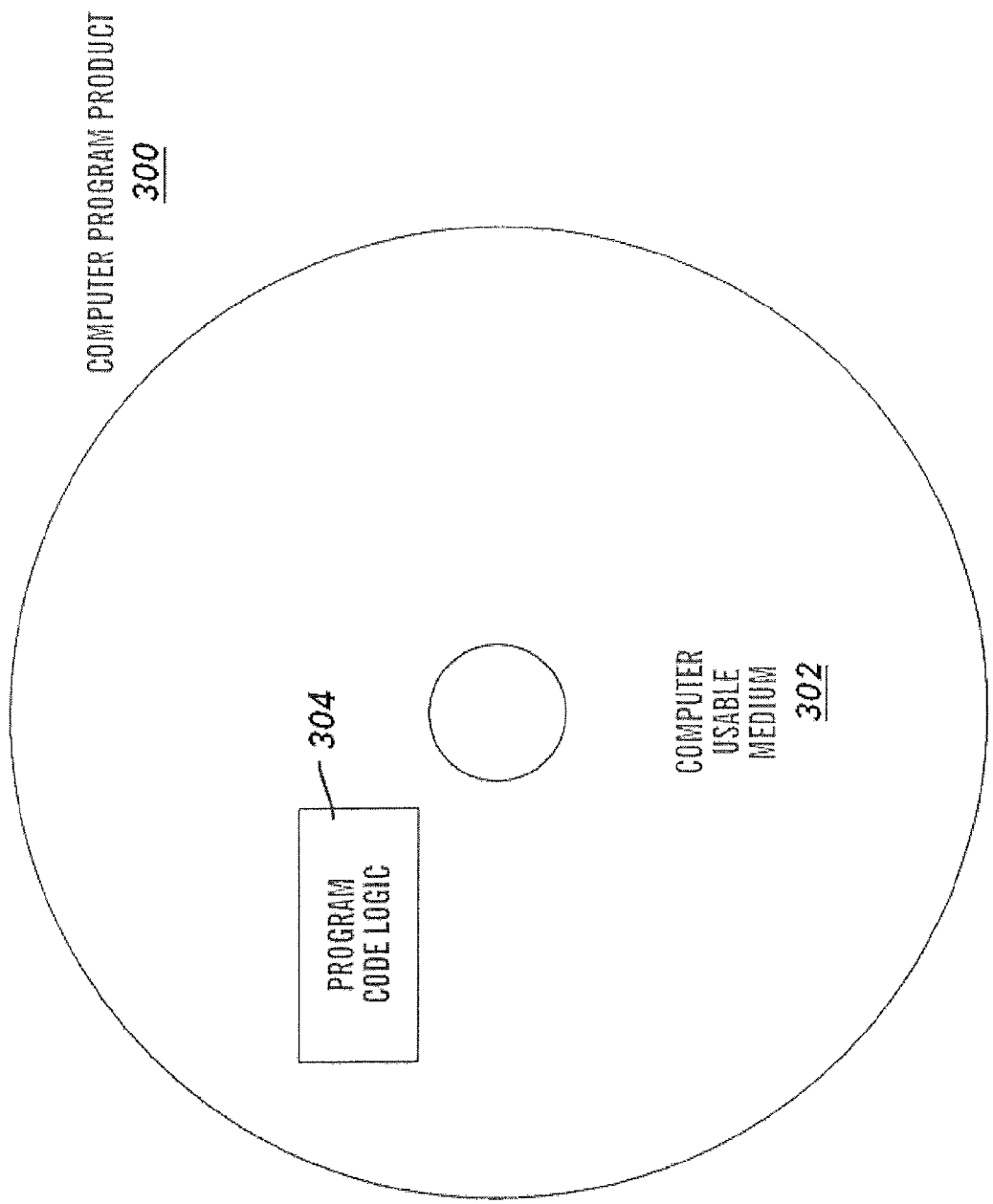
FIG. 3 depicts an exemplary embodiment of a computer program product for managing access to resources in a host system.

As described above, embodiments can be embodied in the form of computer-implemented processes and apparatuses for practicing those processes. In exemplary embodiments, the invention is embodied in computer program code executed by one or more network elements. Embodiments include a computer program product 300 as depicted in FIG. 3 on a computer usable medium 302 with computer program code logic 304 containing instructions embodied in tangible media as an article of manufacture. Exemplary articles of manufacture for computer usable medium 302 may include floppy diskettes, CD-ROMs, hard drives, universal serial bus (USB) flash drives, or any other computer-readable storage medium, wherein, when the computer program code logic 304 is loaded into and executed by a computer, the computer becomes an apparatus for practicing the invention. Embodiments include computer program code logic 304, for example, whether stored in a storage medium, loaded into and/or executed by a computer, or transmitted over some transmission medium, such as over electrical wiring or cabling, through fiber optics, or via electromagnetic radiation, wherein, when the computer program code logic 304 is loaded into and executed by a computer, the computer becomes an apparatus for practicing the invention. When implemented on a general-purpose microprocessor, the computer program code logic 304 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method for managing access to system resources, the method comprising:
   receiving a request from a user for write-access to a resource in a host system, the host system including write-access permissions to the resource for one or more selected users;
   accessing the resource in the host system, wherein access is granted regardless of a permission status of the user;
   presenting the resource to the user to allow the user to make changes to the resource;
   determining whether the user has write-access permission to the resource; determining whether the resource is a temporarily writable resource;
   responsive to the resource being temporarily writable and the user having write-access permission, permitting the changes to be written to the resource in the host system;
   responsive to the resource being temporarily writable and the user not having write-access permission, permitting the changes to be written to the resource in the host system;
   responsive to the resource being temporarily writable and the user not having write-access permission, discarding changes to the resource made by the user and returning the resource without the changes to the host system;
   wherein presenting the resource includes saving a temporary copy of the resource in a memory, and discarding the changes includes erasing the temporary copy from the memory; and
   wherein the user includes multiple users and presenting the temporary copy includes presenting a plurality of temporary copies in the memory, each of the plurality of temporary copies being associated with a respective user.

2. The method of claim 1, wherein the resource is at least one of a file and a file folder, and the host system includes at least one of a file system and a virtual file system.

3. The method of claim 1, further comprising saving the discarded changes in a memory.

4. The method of claim 1, wherein determining whether the resource is a temporarily writable resource includes at least one of checking a list of temporarily writable resources and checking a tag associated with the resource.

5. The method of claim 1, further comprising, responsive to the resource not being temporarily writable, transferring the resource and the changes to the host system.

6. The method of claim 1, wherein the user is a user system in communication with the host system.

7. The method of claim 1, wherein the request received from the user via a subsystem is transparent relative to the user.

8. The method of claim 1, wherein the request is received from the user via a subsystem that is included in an abstraction layer of at least one of the host system and a user system.

9. A computer program product for managing access to system resources, the computer program product comprising:
   a tangible storage medium readable by a processing circuit and storing instructions for execution by the processing circuit for performing a method comprising:

receiving a request from a user for write-access to a resource in a host system, the host system including write-access permissions to the resource for one or more selected users;

accessing the resource in the host system, wherein access to the resource is granted regardless of a permission status of the user;

presenting the resource to the user to allow the user to make changes to the resource;

determining whether the user has write-access permission to the resource;

determining whether the resource is a temporarily writable resource;

responsive to the resource being temporarily writable and the user having write-access permission, permitting the changes to be written to the resource in the host system; and responsive to the resource being temporarily writable and the user not having write-access permission, discarding changes to the resource by the user and returning the resource without the changes to the host system;

wherein presenting the resource includes saving a temporary copy of the resource in a memory, and discarding the changes includes erasing the temporary copy from the memory; and wherein the user includes multiple users and presenting the temporary copy includes presenting a plurality of temporary copies in the memory, each of the plurality of temporary copies being associated with a respective user.

10. The computer program product of claim 9, further comprising, responsive to the resource being temporarily writable and the user having write-access permission, permitting the changes to be written to the resource in the host system.

11. A system for managing access to resources in a host system, the system comprising:

a computer memory;

a processor in communication with the computer memory, the processor comprising an instruction fetching unit for fetching instructions from the computer memory and one or more execution elements for executing fetched instructions to perform a method comprising:

receiving a request from a user for write-access to a resource in a host system, the host system including write-access permissions to the resource for one or more selected users;

accessing the resource in the host system, wherein access to the resource is granted regardless of a permission status of the user;

presenting the resource to the user to allow the user to make changes to the resource;

determining whether the user has write-access permission to the resource;

determining whether the resource is a temporarily writable resource;

responsive to the resource being temporarily writable and the user having write-access permission, permitting the changes to be written to the resource in the host system;

responsive to the resource being temporarily writable and the user not having write-access permission, discarding changes to the resource by the user and returning the resource without the changes to the host system; and wherein presenting the resource includes saving a temporary copy of the resource in a memory, and discarding the changes includes erasing the temporary copy from the memory; and wherein the user includes multiple users and presenting the temporary copy includes presenting a plurality of temporary copies in the memory, each of the plurality of temporary copies being associated with a respective user.

12. The system of claim 11, wherein the processor is included in an abstraction layer of at least one of the host system or a user system.

13. The system of claim 11, further comprising, responsive to the resource being temporarily writable and the user having write-access permission, permitting the changes to be written to the resource in the host system.

* * * * *